United States Patent Office 3,170,955
Patented Feb. 23, 1965

3,170,955
AMINO AND HALOGEN SUBSTITUTED-N-DI-LOWERALKYLAMINO-ALKYL-BENZAMIDES
Richard K. Richards and Maynette R. Vernsten, Waukegan, Ill., assignors to Abbott Laboratories, North Chicago, Ill., a corporation of Illinois
No Drawing. Filed Apr. 25, 1958, Ser. No. 730,782
5 Claims. (Cl. 260—558)

This invention relates to a new class of benzamide derivatives and particularly to substituted N-(β-dialkylaminoalkyl)-benzamides. The invention also relates to a method for making these compounds.

The compounds may be generally described as those bases having the formula:

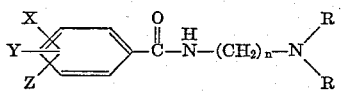

wherein X is halogen, Y is selected from the class consisting of amino and nitro groups, Z is selected from the group consisting of halogen and hydrogen, n is a small whole number and R is lower alkyl.

The compounds defined above in which Y is amino, are active in restoring normal rhythm to the fibrillating heart and are referred to herein as anti-fibrillatory benzamides. These compounds are also active in preventing vomiting and are therefore useful as anti-emitic agents.

The compounds, as described above, in which Y is a nitro group instead of an amino group are useful as intermediates in the preparation of the active compounds disclosed herein.

The novel compounds of this invention include the non-toxic acid addition salts such as the hydrochloride, sulfate, oxalate, tartrate, and hexamate as well as the quaternary ammonium salts such as the methochloride, methosulfate, etc., which are prepared in the usual manner.

One suitable method for making the compounds of this invention involves reacting a substituted benzoic acid with thionyl chloride at refluxing temperatures. The reaction product is thereafter reacted with a dialkylaminoalkylamine to form the condensation product described in the foregoing formula. One may use nitro substituted benzoic acid in the reaction and in such case a nitro substituted benzamide will be formed. This compound may be catalytically reduced according to customary procedures with the formation of the corresponding amino substituted benzamide. The salts of the bases are readily formed by mixing with an inorganic or organic acid solution. The quaternary ammonium salt may be prepared by customary methods employing an alkyl halide. In another synthesis it is possible to start with an amino substituted benzamide and slowly add a halogen at a reduced temperature of about 10° C.

The following examples are presented in order to disclose the invention more fully. It should be understood, however, that the examples are not intended to limit the invention in any way.

EXAMPLE I

*N-(β-diethylaminoethyl)-2-chloro-4-aminobenzamide hydrochloride*

To about 50 g. (0.25 mole) 2-chloro-4-nitrobenzoic acid in a refluxing dry benzene solution is carefully added about 36 g. (0.3 mole) thionyl chloride, the mixture refluxed five hours, allowed to stand at room temperature 16 hours and most of the benzene and excess thionyl chloride then distilled off at atmospheric pressure. More dry benzene is added to the concentrate and partially distilled off. This concentrate is cooled to less than 20° C. and stirred and cooled as the theoretical amount of diethylaminoethylamine in benzene solution is slowly added. Cooling is discontinued and the mixture is then stirred at room temperature an additional hour. The tan product N-(β-diethylaminoethl)-2-chloro-4-nitrobenzamide is collected by filtration and dried, M.P. 163–165°. Recrystallization of the solid gives pure material of M.P. 167–168° C.

The 4-nitro base is catalytically reduced using Raney nickel and the resulting N-(β-diethylaminoethyl)-4-amino-2-chlorobenzamide is extracted from the alkaline solution with chloroform and then distilled, B.P. 240° C./2.2 mm., M.P. 77–78° C. The base may be recrystallized from chloroform-petroleum ether solution. Solution of the base in absolute alcohol and treatment with the calculated amount of alcoholic acid solution provides the following salts: monohydrochloride, M.P. 137–140° C.; dihydrochloride, M.P. 188–193° C.; and neutral sulfate, M.P. 206–208° C.

EXAMPLE II

*N-(β-diethylaminoethyl)-4-amino-3,5-dibromobenzamide*

To a stirred chloroform solution of about 23 g. (0.1 mole) N-(β-diethylaminoethyl)-p-aminobenzamide held at about 10° C. is slowly added about 32 g. (0.4 atom) bromine. A tarry substance results by the time addition is complete and the mixture is allowed to stand at room temperature for about 16 hours. The chloroform is decanted and the residual material taken up in water. The aqueous solution is filtered, chilled and made alkaline with sodium hydroxide solution. The product is extracted with chloroform, the extracts concentrated and the residue distilled; a small amount of brown distillate, B.P. 220–230° C./5–10 mm. is recovered. This is mostly the desired dibromo compound mixed with some of the monobromo derivative.

EXAMPLE III

*N-(β-diethylaminoethyl)-2-amino-4-chlorobenzamide*

The method of Example I is followed by substituting 0.25 mole of 2-nitro-4-chlorobenzoic acid in place of the 2-chloro-4-nitrobenzoic acid. The reaction with thionyl chloride is repeated and the condensation with diethylaminoethylamine is repeated. The hydrochloride of N-(β-diethylaminoethyl)-2-nitro-4-chlorobenzamide is prepared and is found to have a melting point of 127° C.–130° C.

The nitro base is catalytically reduced in the same manner as described in Example I with the formation of N-(β-diethylaminoethyl)-2-amino-4-chlorobenzamide. This compound has a boiling point of 182° C. at 0.6 mm. and the hydrochloride prepared therefrom has a melting point of 160° C.–162° C.

EXAMPLE IV

*N-(β-diethylaminoethyl)-3-amino-4-chlorobenzamide*

The procedure outlined in Example I is repeated substituting 3-nitro-4-chloro-benzoic acid. The compound N-(β - diethylaminoethyl)-3-nitro-4-chlorobenzamide hydrochloride is prepared and is found to have a melting point of 172° C.–174° C. The nitro compound is hydrogenated to form the corresponding 3-amino-4-chlorobenzamide which is found to have a melting point of 63° C.–64° C.

EXAMPLE V

*N-(β-diethylaminoethyl)-2-chloro-5-aminobenzamide*

The procedure employed in Example I is repeated using 2-chloro-5-nitrobenzoic acid. The compound N-(β-diethylaminoethyl)-2-chloro-5-nitrobenzamide is prepared, M.P. 139–140° C., and is hydrogenated to the corresponding 2-chloro-5-aminobenzamide. This compound has a boiling point of 212° C. at 0.8 mm.

EXAMPLE VI

*N-(β-diethylaminoethyl)-2-amino-6-chlorobenzamide*

The procedure outlined in Example I is repeated using 2-nitro-6-chlorobenzoic acid with the formation of N-(β-diethylaminoethyl)-2-nitro-6-chlorobenzamide. The hydrochloride of this compound melts at 152° C.–153° C. The corresponding 2-amino-6-chlorobenzamide is prepared by hydrogenation and is found to have a boiling point of 186° C. at 0.6 mm. The hydrochloride melts at 182° C.–184° C.

EXAMPLE VII

*N-(β-diethylaminoethyl)-3-chloro-4-aminobenzamide*

The procedure in Example I is repeated employing 3-chloro-4-nitrobenzoic acid. The N-(β-diethylaminoethyl)-3-chloro-4-nitrobenzamide is obtained and is hydrogenated to obtain the N-(β-diethylaminoethyl)-3-chloro-4-aminobenzamide.

EXAMPLE VIII

*N-(β-diethylaminopropyl)-3-amino-4-chlorobenzamide*

The method of Example I is followed by substituting 32.6 g. (0.25 mole) of diethylaminopropylamine in place of diethylaminoethylamine. The crude product N-(β-diethylaminopropyl)-3-nitro-4-chlorobenzamide has a melting point of 163–170° C. and upon recrystallization with 2-propanol has a melting point of 169–171° C.

The nitro base is catalytically reduced in the same manner as described in Example I with the formation of N-(β-diethylaminopropyl)-3-amino-4-chlorobenzamide. The dihydrochloride of this compound is recrystallized from methanol and dry ether and has a melting point of 216–218° C.

This application is a continuation-in-part of co-pending application Serial No. 360,366, filed June 8, 1953.

Others may practice the invention in all of the numerous ways which will be suggested to one skilled in the art. It is considered that such practice is covered by the invention provided it falls within the scope of the appended claims.

We claim:
1. N-(β-diethylaminoethyl)-2-chloro-4-aminobenzamide.
2. N-(β-diethylaminoethyl)-2-chloro-5-aminobenzamide.
3. N-(β-diethylaminopropyl)-3-amino-4-chlorobenzamide.
4. A compound selected from the group consisting of bases having the formula:

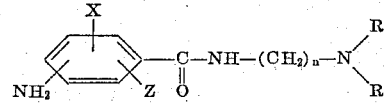

where X is selected from the group consisting of chlorine and bromine, Z is selected from the group consisting of chlorine, bromine and hydrogen, $n$ is an integer of from two to three and R is loweralkyl, and the non-toxic, acid addition salts thereof.

5. A compound selected from the group consisting of bases having the formula:

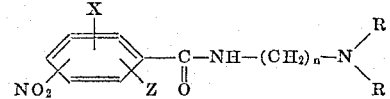

where X is selected from the group consisting of chlorine and bromine, Z is selected from the group consisting of chlorine, bromine and hydrogen, $n$ is an integer of from two to three and R is loweralkyl, and the non-toxic, acid addition salts thereof.

References Cited in the file of this patent
FOREIGN PATENTS
1,159,180    France _____ Feb. 10, 1958

OTHER REFERENCES
Goldberg et al.: Quart. J. Pharm. Pharmacol., vol. 21, page 12, 1948.